US011620323B2

(12) United States Patent
Strong, II et al.

(10) Patent No.: US 11,620,323 B2
(45) Date of Patent: *Apr. 4, 2023

(54) COMPLEX COMPUTING NETWORK FOR USING DATA FROM DIGITAL TRACKING AND RELAYING SYSTEMS (71) Applicant: TIV INC., Chicago, IL (US)

(72) Inventors: Edward C. Strong, II, Chicago, IL (US); John P. Pillat, Western Springs, IL (US); Edward C. Strong, Bristol, RI (US)

(73) Assignee: TIV INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,648

(22) Filed: Mar. 7, 2022

(65) Prior Publication Data
US 2022/0232087 A1    Jul. 21, 2022

Related U.S. Application Data (63) Continuation of application No. 17/062,464, filed on Oct. 2, 2020, now Pat. No. 11,269,945.

(51) Int. Cl.
G06F 16/435    (2019.01)
G06F 16/487    (2019.01)
(Continued)

(52) U.S. Cl.
CPC .......... G06F 16/437 (2019.01); G06F 16/13 (2019.01); G06F 16/487 (2019.01); G06Q 30/0207 (2013.01); H04L 67/535 (2022.05)

(58) Field of Classification Search
CPC ..... H04L 67/22; H04L 67/535; G06F 16/437; G06F 16/487; G06F 16/13; G06Q 30/0207
(Continued)

(56) References Cited

U.S. PATENT DOCUMENTS 8,167,710 B2    5/2012    Agarwal et al.
8,425,295 B2    4/2013    Ballas
(Continued)

OTHER PUBLICATIONS

International Search Report and Written Opinion dated Jan. 17, 2022 in connection with International Patent Application No. PCT/US2021/053205, 10 pages.

Primary Examiner — Taylor A Elfervig
(74) Attorney, Agent, or Firm — Baker & McKenzie LLP (57) ABSTRACT This disclosure is directed to a complex computing network for obtaining and using data from a transmitting system and a digital tracking and relaying system. An exemplary method comprises: receiving, from a transmitting system, a first input data associated with a registered user account; receiving, from a digital tracking and relaying system, a second input data associated with the registered user account and captured by a sensor comprised in the digital tracking and relaying system, wherein the second input data is transmitted via an application programming interface (API) comprised in or associated with the digital tracking and relaying system, the second input data comprising usage data associated with the digital tracking and relaying system; and associating at least one of the first input data or the second input data with the registered user account, thereby causing an update to the registered user account.

20 Claims, 4 Drawing Sheets (51) Int. Cl.
*G06F 16/13* (2019.01)
*G06Q 30/02* (2012.01)
*H04L 67/50* (2022.01)
*G06Q 30/0207* (2023.01)

(58) Field of Classification Search
USPC .......................................................... 709/218
See application file for complete search history.

(56) References Cited

U.S. PATENT DOCUMENTS

| | | |
|---|---|---|
| 9,202,334 B2 | 12/2015 | Adiraju et al. |
| 2009/0287558 A1 | 11/2009 | Seth et al. |
| 2010/0304848 A1 | 12/2010 | Detlefsen et al. |
| 2016/0360336 A1 | 12/2016 | Gross et al. |
| 2017/0300655 A1* | 10/2017 | Lane ...................... G16H 10/60 |
| 2017/0354846 A1* | 12/2017 | Von Rueckmann ... G16H 50/50 |
| 2018/0342329 A1 | 11/2018 | Rufo et al. |
| 2019/0065692 A1 | 2/2019 | Connelly |
| 2019/0073666 A1 | 3/2019 | Ortiz et al. |
| 2019/0197307 A1* | 6/2019 | Yeh ........................ G06V 30/40 |
| 2019/0205917 A1 | 7/2019 | Ericson et al. |

* cited by examiner

COMPLEX COMPUTING NETWORK FOR USING DATA FROM DIGITAL TRACKING AND RELAYING SYSTEMS

CROSS-REFERENCE TO RELATED APPLICATIONS

This application claims the benefit of, and is a continuation of U.S. Nonprovisional patent application Ser. No. 17/062,464 filed Oct. 10, 2020, which is incorporated by reference herein in its entirety.

TECHNICAL FIELD

This disclosure is directed to obtaining and using data from transmitting systems and digital tracking and relaying systems in complex computing networks.

BACKGROUND

There is a need for seamlessly obtaining and using data from disparately located systems, including transmitting systems and digital tracking and relaying systems.

BRIEF SUMMARY

This disclosure provides methods and systems for obtaining and using data from disparately located systems, including transmitting systems and digital tracking and relaying systems. According to one implementation, the system receives a first input data from one or more transmitting systems. The first input data may be associated with a registered user account such that the first input data may be used in a first computing operation associated with a first processing platform. The registered user account may be stored in a user database. The system may also receive a second input data from one or more digital tracking and relaying systems. The second input data may be associated with the registered user account and may be captured by at least one sensor comprised in the one or more digital tracking and relaying systems such that the second input data may be generated independently from the first input data and at a different time from the first input data. According to one implementation, the second input data may be actively and/or passively transmitted using an application programming interface (API) comprised in, or associated with the one or more digital tracking and relaying systems such that the second input data comprises usage data associated with the one or more digital tracking and relaying systems. The system may further associate the first input data with the registered user account thereby causing a first update to the registered user account. The first update may comprise updating a first parameter associated with the registered user account. The system may also associate the second input data with the registered user account thereby causing a second update to the registered user account. The second update may comprise updating the first parameter associated with the registered user account or a second parameter associated with the registered account. The system may then enable usage of output data, based on the first parameter or the second parameter, in a second computing operation associated with a second processing platform that is different from the first processing platform. A determination may be made that the output data qualifies for use in the second computing operation prior to execution of the second computing operation.

In some cases, associating at least one of the first input data or the second input data with the registered user account comprises performing a third computing operation based on the at least one of the first input data or the second input data. In some implementations, the system executing the processes outlined above may comprise one or more computing device processors that are comprised in one or more disparately located computing devices. The system may also execute an authentication operation based on identification or authentication information received from at least one of a user or a computing device prior to updating, adding, or editing data associated with, or comprised in the registered user account.

In one embodiment, the usage data comprises usage duration or usage frequency data associated with the one or more digital tracking and relaying systems. Furthermore, the usage data may also comprise performance or achievement data associated with using the one or more digital tracking and relaying systems. According to some implementations, the second input data comprises game-related data. The second input data may also comprise physical activity-related data. In addition, the second input data may also comprise at least one of geo-location data or network location data associated with the one or more digital tracking and relaying systems.

The first input data may comprise at least one of geo-location data or network location data associated with the first computing operation. The first input data may comprise at least one of an amount or a type associated with the first computing operation.

The at least one sensor comprised in the one or more digital tracking and relaying systems may include at least one of a software application that tracks data associated with the one or more digital tracking and relaying systems. The at least one sensor comprised in the one or more digital tracking and relaying systems may also include a hardware system that tracks data associated with the one or more digital tracking and relaying systems. Furthermore, the one or more digital tracking and relaying systems may comprise a specialized game-playing system. The one or more digital tracking and relaying systems may also comprise an exercise system. In some embodiments, the one or more digital tracking and relaying systems comprises a game-playing system. In some implementations, the one or more digital tracking and relaying systems comprises at least one of a desktop computer, a laptop computer, a handheld computing device, a gaming device or console, a smartphone, a wearable device, a biometric device, a video processing device, a virtual machine, a cloud-based computing or gaming or streaming system, a network-connected exercise equipment, a network appliance, and or an entertainment device.

According to some implementations, the parameter comprises the output data. The output data may qualify for use in the second computing operation based on at least one of a type of the second computing operation, a product or service associated with the second computing operation, an amount associated with the second computing operation, or a geo-location or a network location associated with the second computing operation.

In one embodiment, associating at least one of the first input data or the second input data with the registered user account, thereby causing the update to the registered user account, wherein the update comprises updating a parameter associated with the registered user account, comprises: converting the first input data into a first intermediate input data associated with the registered user account; converting the second input data into second intermediate input data associated with the registered user account; and associating the at least one of the first intermediate input data or the second intermediate input data with the registered user account, or updating the parameter associated with the registered user account based on the at least one of the first intermediate input data or the second intermediate input data.

In some embodiments, the transmitting system and/or the digital tracking and relaying system may initially communicate with an identification database such that a computing operation is executed to authenticate, register and associate the systems with a unique user or entity.

In some embodiments, the system transmitting the first input data and/or the second input data may be comprised in one or more devices such that a computing operation executed by the identification database authenticates and confirms each device that is associated with the user account. If the computing operation positively confirms an association, the device may be used as part of the transmitting system. Similarly, in some embodiments, the digital tracking and relaying system may be comprised in one or more devices and/or services such that a computing operation executed by the identification database authenticates and confirms each device and/or service and causes said device and/or service to be associated with the user account. If the computing operation positively confirms the association, the device may be used as part of the digital tracking and relaying system.

In some embodiments, a transmitting system may communicate with an intermediate signal processor including a user interaction terminal (e.g., graphical user interface) to generate the first input data. A secure verification system may be used to validate or otherwise confirm the authenticity of the first input data. In the event that the first input data is validated by the secure verification system, the first input data may be transmitted to the signal integration system. Following transmission of the first input data, a signal integration system may perform a computing operation to generate a first intermediate input data which may be subsequently transmitted to an identification database for association with a registered user account.

In some embodiments, the first intermediate input data may be determined based on a system of rules or other criteria associated with one or more control files of the signal integration system. In some embodiments, a limit may be applied to the first intermediate input data. In one or more arrangements, the first intermediate input data may be categorized or otherwise graded. The grade of the first intermediate input data may be determined using a different system or systems which may comprise devices, networks, services, and/or actions. In some embodiments, the identification database may store one or multiple first intermediate input data associated with a user or entity to execute future computing operations.

In some embodiments, the digital tracking and relaying system may generate a second input data which is subsequently transmitted to the signal integration system directly and/or indirectly using an API processing and communication server. The signal integration system may execute a computing operation to generate the second intermediate input data based on the second input data. Upon generating the second intermediate input data, the signal integration system may transmit the second intermediate input data to the identification database where the second intermediate input data is associated with a registered user account or a registered entity account.

In some embodiments, the second intermediate input data may be generated based on a system of rules or other criteria associated with one or more control files of the signal integration system. In some cases, a limit may be applied to the second intermediate input data. In one or more instances, the second intermediate input data may be categorized or graded. The grade of the second intermediate input data may be determined using a different system or systems, which may be comprised of devices, networks, services, and/or actions other than the signal integration system.

In some embodiments, the identification database may store one or multiple second intermediate input data associated with the registered user/entity account to execute future computing operations.

In some embodiments, the apparatus may establish associations that combine the first intermediate input data and second intermediate input data to create a combined data indicative of an increase over a magnitude of the two independent intermediate input data and thereby enhance a value of the first and second input data. Via the identification database, the combined data, which may be referred to as output data, is transmitted to a signal manipulation system.

In some embodiments, the combined data may be generated based on a system of rules or other criteria associated with one or more control files of the identification database. In some embodiments, a limit may be applied to the combined data. In one or more implementations, the combined data may be qualitatively categorized and generated to have different grades. For example, a first-grade combined data may be more valuable than a second-grade combined data. The grade of a combined data may be determined through a different system or systems, which may be comprised of devices, networks, services, and/or activities.

In some embodiments, the signal manipulation system may store one or multiple combined data associated with the registered user/entity account.

In some embodiments, a user or entity may need to register with the signal manipulation system to access one or multiple combined data. Registration may comprise providing identification information associated with the transmitting system and/or the digital tracking and relaying system to allow the signal manipulation system to perform a computing operation that verifies the identity of the user or entity. Upon acceptance of the association between the signal manipulation system, the transmitting system, and/or the digital tracking and relaying system, the user or entity may access the signal manipulation system and view all associated combined data. The signal manipulation system may operate one or more devices or services associated with the user or entity, according to some implementations. Moreover, the user or entity may access the signal manipulation system using the one or more devices and/or services.

In some embodiments, the user or entity may exchange the combined data for physical, virtual and/or digital assets, transfer the combined data for storage by the transmitting system, and/or elect to aggregate the combined data or multiple combined data for use at a later date or time.

In some embodiments, an apparatus may be provided that allows for the signal manipulation system to execute a computing operation that customizes, generates and/or transmits alternative resources to the transmitting system and/or the digital tracking and relaying system based on an analysis of the first input data and/or the second input data, the output data and/or the combined data of a user or entity.

BRIEF DESCRIPTION OF THE DRAWINGS

All of these drawings are illustrations of certain embodiments. The scope of the claims is not limited to the specific embodiments illustrated in the drawings and descriptions below.

DETAILED DESCRIPTION OF THE EMBODIMENTS

Figure 1:
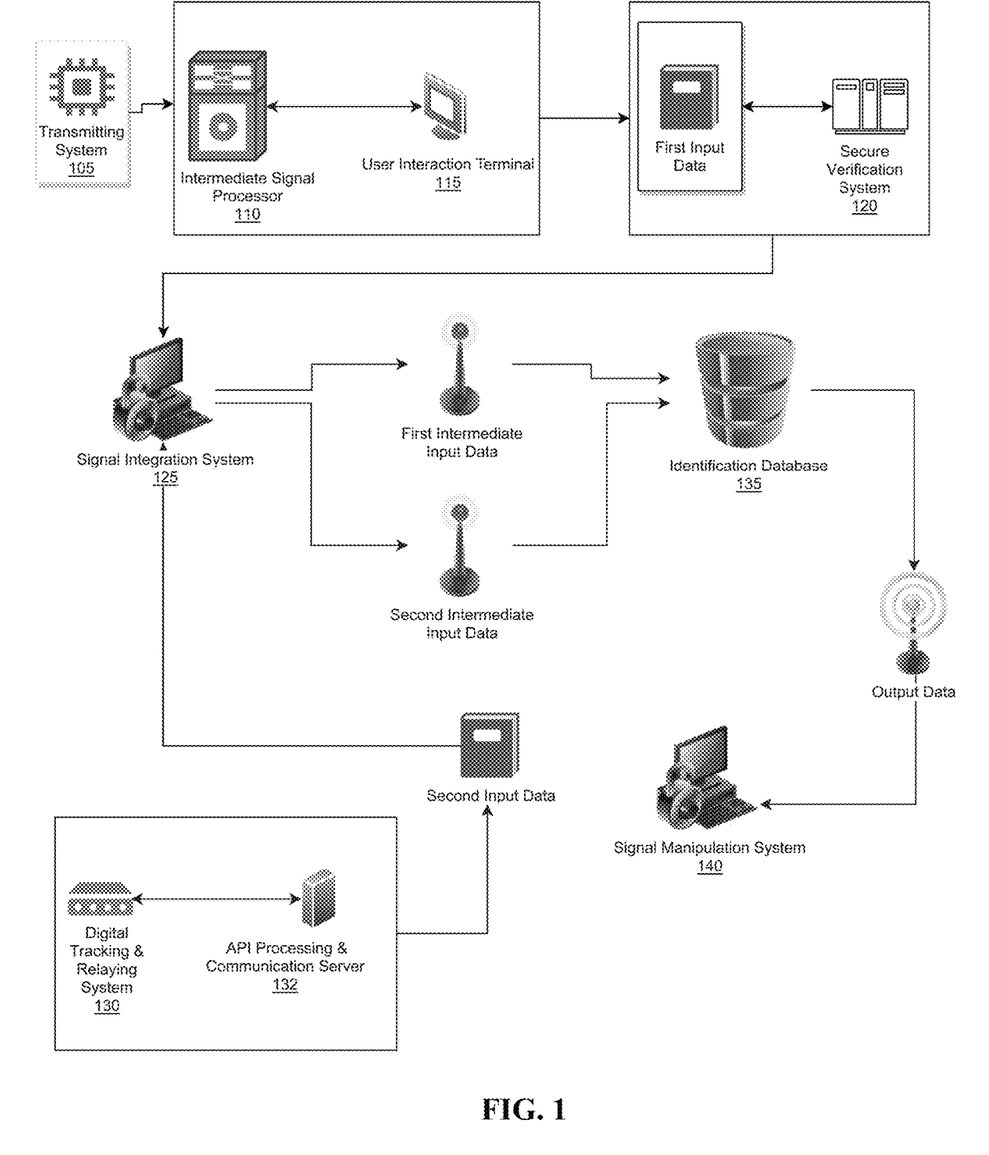
FIG. 1 is a system environment for obtaining and using data obtained from a transmitting system and a digital tracking and relaying system, according to some embodiments of this disclosure.

FIG. 1 is an example system environment for obtaining and using data obtained from a transmitting system and a digital tracking and relaying system. In the depicted implementation, the system environment may comprise a transmitting system 105, an intermediate signal processor 110 communicatively coupled to a user interaction terminal 115, a secure verification system 120, a signal integration system 125, a digital tracking and relaying system 130, an identification database 135, and a signal manipulation system 140. In some cases, the digital tracking and relaying system 130 is communicatively coupled to an API processing and communication server 132 as further discussed below. According to some embodiments, the functionality of multiple devices in FIG. 1 may be combined in a single apparatus. While a single transmitting system 105 is illustrated, the disclosed principles and techniques could be expanded to multiple transmitting systems. Similarly, while a single digital tracking and relaying system 130 is illustrated, the disclosed principles and techniques are expandable to multiple digital tracking and relaying systems. The various systems described in this disclosure may refer to apparatuses, servers, devices, users, entities, etc. According to one implementation, one or more subsystems of the system environment of FIG. 1 may comprise an intelligent processor. An intelligent processor may be a processor that executes computing operations to learn of signal or data associations, generate data values, create new data, and/or establish data associations. Such apparatuses may also comprise memory that stores computer-readable code, which when executed by the processor, causes the processor and/or other systems in the apparatus to perform the various methods and/or other principles described in this disclosure. In some embodiments, although some of the subsystems of FIG. 1 are not indicated as being connected, they may be connected to each other. Moreover, the various subsystems of the system environment of FIG. 1 may include one or more computing device processors (e.g., intelligent processors) that may execute the processes or principles discussed in this disclosure such that the one or more computing device processors are comprised in one or more disparately located computing devices.

In one embodiment, any system described herein may comprise a housing that includes various subsystems. The subsystems may include a processor, a memory unit, an input/output unit, and a communication interface. In some embodiments, a chipset may be disposed in the housing and may be interfaced with the processor such as a signal processor or an intelligent processor. The chipset may have hardware (e.g. electronic components in an electronic circuit) for supporting various connections within the system (e.g. between units), or any other connection from the system to external systems or devices. The chipset may be an intelligent chipset for initiating an intelligent computing operation and/or an association or connection operation described herein.

The transmitting system 105 may be used to generate a first input data. The first input data may comprise at least one of geo-location data or network location data associated with a first computing operation. The first input data also may comprise at least one of an amount or a type associated with the first computing operation. In one embodiment, the first input data may be associated with a registered user account or a registered entity account such that the first input data may be used in a first computing operation associated with a first processing platform. The transmitting system 105 may include a computing device such as a smartphone, a hand-held computing device, a wearable device, a biometric device, and/or the like. Alternatively, the transmitting system 105 may be non-computing hardware such as a physical card (e.g., smart card, a card with a microchip, etc.). In one embodiment, the transmitting system 105 is communicatively coupled to an intermediate signal processor 110 which comprises a user interaction terminal 115. In some embodiments, the user interaction terminal 115 may be a frontier station such as a computing device (e.g. a mobile computing device, a non-mobile computing device) used in transactions. In some embodiments, the user interaction terminal 115 may refer to any real-time or near real-time computing means. The transmitting system 105 may communicate with the intermediate signal processor via the user interaction terminal 115 to generate and/or transmit the first input data. According to one implementation, the user interaction terminal 115 may detect (e.g. determine, receive, etc.) the first input data. If the first input data is detected, the intermediate signal processor 110 may transmit the first input data to the secure verification system 120. The secure verification system 120 may analyze and/or process the first input data to validate the first input data and/or determine whether the first input data may be transmitted to the signal integration system 125. It is appreciated that, in some embodiments, a plurality of first input data may be validated and transmitted to the signal integration system 125. Moreover, the signal integration system 125 may receive the first input data directly from other subsystems of the system environment of FIG. 1 without using the secure verification system 120. For example, the signal integration system 125 may directly receive the first input data from the transmitting system 105, or directly from the intermediate signal processor 110, or directly from the user interaction terminal 115 as the case may be.

The digital tracking and relaying system 130 may generate a second input data. In some embodiments, the digital tracking and relaying system may be associated with a cloud-based system/platform (e.g., a cloud-based gaming system and/or a cloud-based service). The digital tracking and relaying system 130 may comprise one or more computing devices and/or services such as a desktop computer, a laptop computer, a handheld computing device, a game-playing device/console/system, a specialized game-playing system (e.g., a specialized gaming system that includes customized software or customized hardware such as a customized integrated circuit), an exercise system, a smartphone, a wearable device, a biometric device, a video processing device, a virtual machine, a cloud-based computing solution and/or service, a cloud-based gaming solution and/or service, a cloud-based streaming solution and/or service, a network exercise equipment, a network appliance, a network-connected home device, an entertainment device, and/or the like. In one embodiment, the digital tracking and relaying system 130 generates and actively and/or passively communicates the second input data directly and/or indirectly through the API processing and communication server 132 to the signal integration system 125 based on usage data associated with the digital tracking and relaying system 130. More specifically, the digital tracking and relaying system 130 may actively and/or passively remain in communication with the API processing and communication server 132 such that the digital tracking and relaying system 130 pings or otherwise initiates operations that cause the API processing and communication server 132 to generate and/or transmit the second input data using one or more APIs. For example, the digital tracking and relaying system 130 may communicate or access the API processing and communication server 132 using one or more APIs and thereby generate and/or transmit the second input data to the signal integration system 125. In some cases, the digital tracking and relaying system 130 tracks one or more open APIs (e.g., a publicly available API that provides developers with programmatic access to a software or a web service) coupled to the API processing and communication server 132 and thereby generates and/or transmits the second output data based on the tracking. Thus, the digital tracking and relaying system 130 may directly generate and transmit one or more second input data to the signal integration system 125 using one or more APIs comprised in the one or more digital tracking and relaying system 130, and/or may indirectly generate and transmit the one or more second input data using one or more APIs associated with the API processing and communication server 132. According to one embodiment, the API processing and communication server 132 may verify or otherwise confirm a user account associated with the digital tracking and relaying system 130 prior to generating and/or transmitting the second output data.

The usage data associated with the digital tracking and relaying system 130, and on which the second input data is based, may comprise usage duration or usage frequency data associated with the digital tracking and relaying system. The usage data may also include performance or achievement data associated with using the digital tracking and relaying system 130. According to some implementations, the second input data may comprise game-related data, physical activity-related data, and geo-location data or network location data associated with one or more digital tracking and relaying systems 130. In some embodiments, the second input data comprises usage data generated from a network-connected device (e.g., keyboard, joystick, game controller, headphones, speakers, a smart home system, a smart home device, a thermostat, etc.) communicatively coupled to at least the digital tracking and relaying system 130, a computing system within which the flowchart of FIG. 3 may be implemented (e.g., one or more subsystems of the system environment of FIG. 1 other than the digital tracking and relaying system 130). The second input data may also comprise usage data generated by an input device (e.g., keyboard, joystick, game controller, etc.) communicatively coupled to the digital tracking and relaying system 130 or associated with the API processing and communication server 132. The second input data may further comprise usage data generated by an output device (e.g. PC monitor, television monitor, headphones, speakers, etc.) communicatively coupled to the digital tracking and relaying system 130 or associated with the API processing and communication server 132, and/or other accessories (e.g., digital accessories associated with a gaming system, or other devices coupled to the digital tracking and relaying system 130. In some embodiments, the signal integration system 125 may analyze and/or process the second input data. It is appreciated that, in some embodiments, a plurality of second input data may be stored in the signal integration system 125.

The signal integration system 125 may execute a computing operation to determine whether either of the first or second input data may be associated with, or be used to generate corresponding first or second intermediate input data. In some embodiments, the computing operation may be executed based on an interaction with the transmitting system 105 or the digital tracking and digital tracking and relaying system 130. It is appreciated that in some embodiments, the signal integration system 125 may include a plurality of endpoint computing devices configured to communicate with one another and/or implement the techniques and actions described herein.

If either of the first or second input data associated with, or are used to generate corresponding first or second intermediate input data, the signal integration system 125 may execute a computing operation to generate the respective first or second intermediate input data. In some embodiments, the first and/or second intermediate input data may be generated based on a signal processing workflow, system of rules, or other criteria that reside in one or more control files on the signal integration system 125. It is further appreciated that, in some embodiments, the first intermediate input data and/or second intermediate input data may be derived from independent input data or signals originating from separate systems, devices and/or services. In some cases, a limit may be applied to the first and/or second intermediate input data. In one or more embodiments, the first and/or second intermediate input data may be categorized and graded to have similar or dissimilar grades. The respective grades of the first and/or second intermediate input data may be determined through a different system or systems, which may comprise devices, networks, services, and/or application programming interfaces (APIs) for communicating with any of the other systems described herein. Upon generating the first and/or second intermediate input data, the signal integration system 125 may transmit either or both the first and second intermediate input data to the identification database 135.

Following the transmission of the first and/or second intermediate input data, the identification database 135 may execute a computing operation that assigns/associates either or both the first and second intermediate input data with the registered user account or a registered entity account. The identification database 135 may further associate the first input data (e.g., using the first intermediate input data) with the registered user account (or the registered entity account) thereby causing a first update to the registered user account. The first update may comprise updating a first parameter associated with the registered user account. The identification database 135 may also associate the second input data (e.g., using the second intermediate input data) with the registered user account thereby causing a second update to the registered user account. The second update may comprise updating the first parameter associated with the registered user account or a second parameter associated with the registered account. In some cases, associating at least one of the first input data or the second input data with the registered user account comprises performing a third computing operation, using the identification database 135, based on the at least one of the first input data or the second input data. The identification database 135 may generate output data based on the update and enable usage of the output data in a second computing operation associated with a second processing platform that is different from the first processing platform based on the first parameter or the second parameter. A determination may be made by the identification database 135 that the output data qualifies for use in the second computing operation prior to execution of the second computing operation In some embodiments, a computing operation may be executed by the identification database 135 using an interaction with the transmitting system 105 or the digital tracking and relaying system 130. It is appreciated that such interactions offer identification information initially collected during the authentication and/or registration of one or more computing devices and/or services that comprise the transmitting system 105 and/or the digital tracking and relaying system 130. In some embodiments, a plurality of second intermediate input data (e.g., based on the second intermediate input data) may be stored in the identification database 135.

In some embodiments, the identification database 135 may establish a data association such that a computing operation may be executed that combines the first intermediate input data and the second intermediate input data to create the output data (e.g., combined data) that is associated with the registered user account or the registered entity account. It is appreciated that the combined data may represent an increase in magnitude over the two independent intermediate input data associated with the registered user account or the registered entity account. This may augment the value of the first and second input data respectively transmitted by the transmitting system 105 and the digital tracking and relaying system 130.

In some embodiments, the output data (e.g., combined data) may be determined based on a system of rules or other criteria associated with one or more control files of the identification database 135. In some cases, a limit may be applied to the combined data. In one or more instances, the combined data may be categorized or otherwise graded to have different grades. For example, a first-grade combined data may be more valuable than a second-grade combined data. The grade of a combined data may be determined through a different system or systems, which may comprise devices, networks, services, and/or application programming interfaces (APIs) for communicating with any of the other systems described herein.

Upon determination of the output data (e.g., combined data), the identification database 135 may transmit the output data to the signal manipulation system 140. The signal manipulation system 140 may be comprised within a processing platform that is different or otherwise distinct from the processing platform from which the first and/or second input data originated. It is appreciated that a plurality of output data associated with registered user account or registered entity account may be stored/processed by the signal manipulation system 140.

A user or entity may need to register or create an account with the signal manipulation system 140 in order to access one or multiple combined data. In some embodiments, registration comprises providing identification information associated with the transmitting system 105 and/or the digital tracking and relaying system 130. Upon determining an association between the signal manipulation system 140, and the transmitting system 105, and/or the digital tracking and relaying system 130, the user or entity may access the signal manipulation system 140 to view all associated output data. Through the signal manipulation system 140, the user or entity may access or exchange one or multiple output data (e.g., combined data) for physical, virtual and/or digital assets, transfer the output data to the transmitting system 105, and/or elect to accrue or otherwise aggregate a plurality of output data for use at a later date and time.

In some embodiments, the signal manipulation system 140 may execute a computing operation that customizes, generates and/or transmits alternative resources to the transmitting system 105 and/or the digital tracking and relaying system 130 based on an analysis of input data, output data and/or combined data associated with the user or entity.

In some embodiments, any of the systems described in this disclosure may comprise application programming interfaces (APIs) for communicating with any of the other systems and/or applications described herein. These APIs may be specialized non-generic APIs that are developed for the particular purpose of communicating with particular systems. In some cases, the APIs are associated with the digital tracking and relaying system 130 such that the digital tracking and relaying system 130 may generate and/or transmit usage data directly and/or indirectly using the APIs (e.g., API's comprised in the digital tracking and relaying system 130 and/or APIs of the API processing and communication server 132) to the signal integration system 125. In some embodiments, a method is provided for performing the various steps performed by any apparatus described herein. In some embodiments, a non-transitory computer-readable medium comprising code is provided for causing a computing device to perform the various methods described herein. In further embodiments, a computer program product comprising a non-transitory computer-readable medium is provided for causing the computing device/one or more computing systems to execute the principles provided in this disclosure.

Figure 2A:
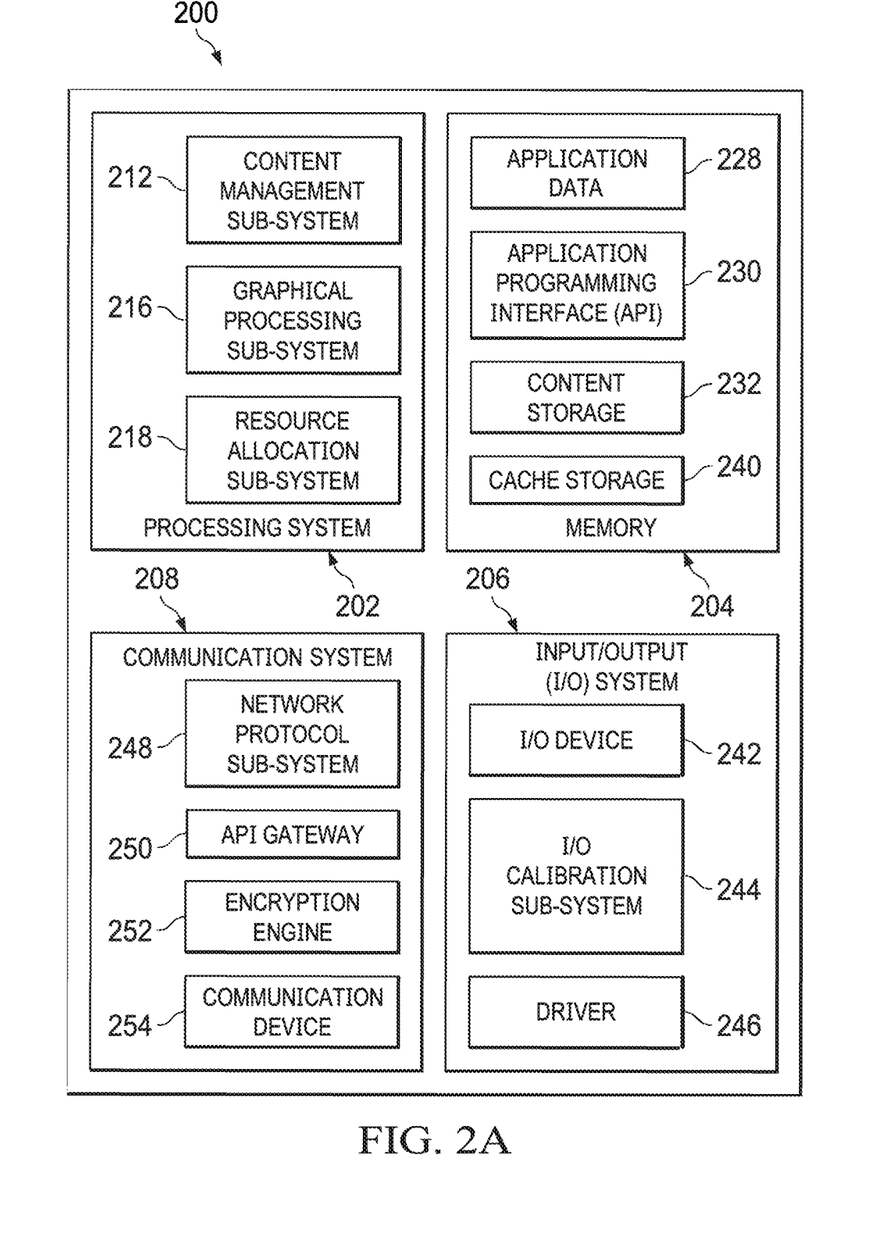
FIG. 2A is an example functional block diagram of a computing environment associated with one or more components of the detailed system environment of FIG. 1, according to some embodiments of this disclosure.
Figure 2B:
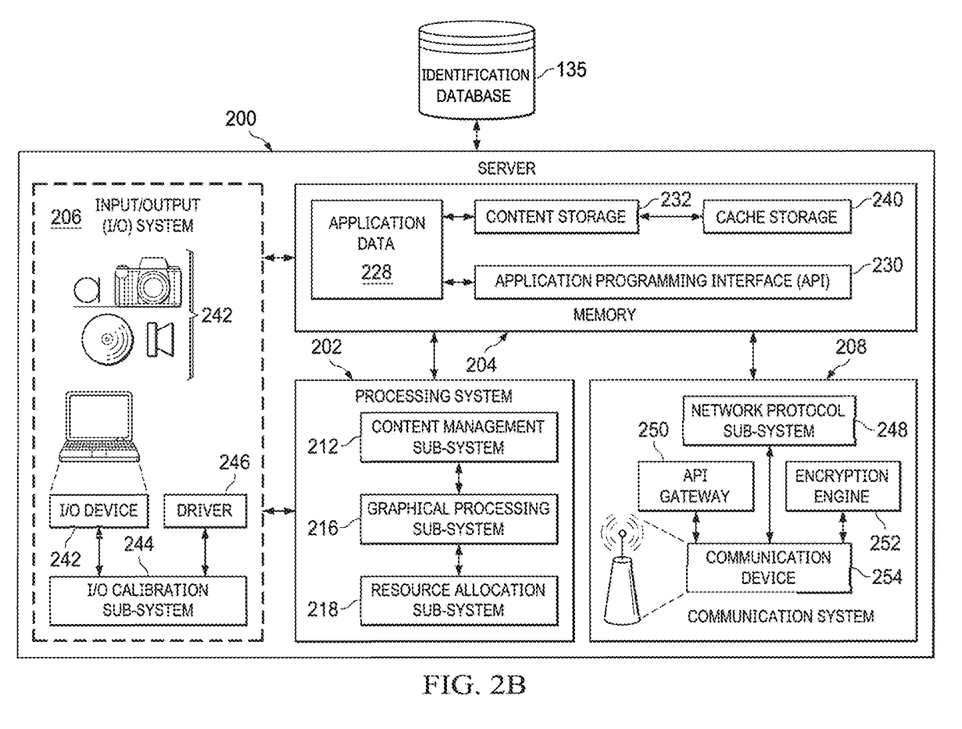
FIG. 2B is an example detailed system diagram of FIG. 2A, according to some embodiments of this disclosure.

The intermediate signal processor 110, and/or the user interaction terminal 115, and/or the secure verification system 120, and/or the signal generation system 125, and/or the digital tracking and relaying system 130, and/or the API processing and communication server 132, and/or the identification database 135, and/or the signal manipulation system 140 may include one or more computing environments such as the computing environment depicted in in FIGS. 2A and 2B. FIGS. 2A and 2B respectively represent exemplary functional and system diagrams of a computing environment 200 according to some embodiments. The computing environment may include a processing system 202, a memory 204, an I/O system 206, and a communication system 208. The processing system 202, the memory 204, the I/O system 206, and the communication system 208 may include one or more subsystems that perform one or more of the operations described herein. Additionally, each system of the computing environment 200 may be operatively and/or otherwise communicatively coupled with each other so as to facilitate one or more operations described herein. The computing environment 200 may include general hardware, specifically-purposed hardware, and/or a combination thereof.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the computing environment 200 or elsewhere in the detailed system environment of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of one or more components of the detailed system environment of FIG. 1, and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, data content, user interfaces, or any combination thereof. In some instances, content on which the content management system 212 operates includes the first intermediate input data, the second intermediate input data, the output data (e.g., combined data), user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the computing environment 200 and/or other computing environments. Computing resources of the computing environment 200 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the computing environment 200, as well as hardware for responding to the computing-resource needs of each system and/or subsystem. In some embodiments, the resource allocation subsystem 218 may use computing resources of a second secure computing environment separate and distinct from the computing environment 200 to facilitate a desired operation.

The memory 204 may be used for storing, recalling, receiving, transmitting, and/or accessing various files and/or data during the operation of the computing environment 200. For example, the memory 204 may store, recall, and/or update data from the identification database 135, signal integration system 125, and/or the signal manipulation system 140 as the case may be. In some embodiments, the memory 204 may store instructions and/or data that may be executed by the processing system 202. For instance, the memory 204 may store instructions that execute operations associated with one or more systems and/or one or more subsystems of the computing environment 200. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of computing environment 200, an intended operating state of computing environment 200, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the computing environment 200. Secondary storage may comprise one or more disk drives and/or tape drives which may be used for non-volatile/non-transitory storage of data or as an over-flow data storage device of the computing environment 200 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application used by the computing environment 200 and/or any other computing environments described herein. As such, application data 228 may store any information and/or data associated with an application. Application data 228 may further store various pieces of information and/or data associated with the operation of an application and/or with the computing environment 200 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of the computing environment 200 and/or any other computing environment described herein. For example, computing environment 200 may include one or more APIs for various devices, applications, systems, subsystems, elements, and/or other computing environments to allow communication between one or more applications associated with the computing environment 200. Accordingly, API 230 may include API databases containing information that may be accessed and/or used by applications, systems, subsystems, elements, and/or operating systems of other devices and/or computing environments in communication with the computing environment 200. In some cases, the API 230 may enable the identification database 135 and the computing environment 200 to communicate with each other.

The content storage 232 may facilitate deployment, storage, access, and/or utilization of information associated with data as further discussed below. In one embodiment, content storage 232 may communicate with a content management system 212 to receive and/or transmit content (e.g., data, media content, etc.).

The I/O system 206 may include hardware and/or software elements for the computing environment 200 to receive, and/or transmit, and/or present information useful for generating one or more interfaces for retrieving and displaying data according to some embodiments of this disclosure. For example, elements of the I/O system 206 may be used to receive input from a user of the computing environment 200. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with the computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of computing environment 200 (or an element of another computing environment) may recognize and/or integrate with I/O device 242.

The communication system 208 may facilitate establishment, maintenance, monitoring, and/or termination of communications between the computing environment 200 and other components of the detailed system environment of FIG. 1. Communication system 208 may also facilitate internal communications between various elements (e.g., systems and/or subsystems) of the computing environment 200. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the computing environment 200 via a network. For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the computing environment 200 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of data.

The application programming interface (API) gateway 250 may allow other devices and/or computing environments and/or applications external to the computing environment 200 to access the API 230 of the memory 204. For example, a computing system may access the API 230 of the computing environment 200 via the API gateway 250. In some embodiments, API gateway 250 may be required to validate user credentials associated with a user of a computing device prior to providing access to the API 230 to the user. API gateway 250 may include instructions for the computing environment 200 and thereby communicate with external devices and/or between components of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 3:
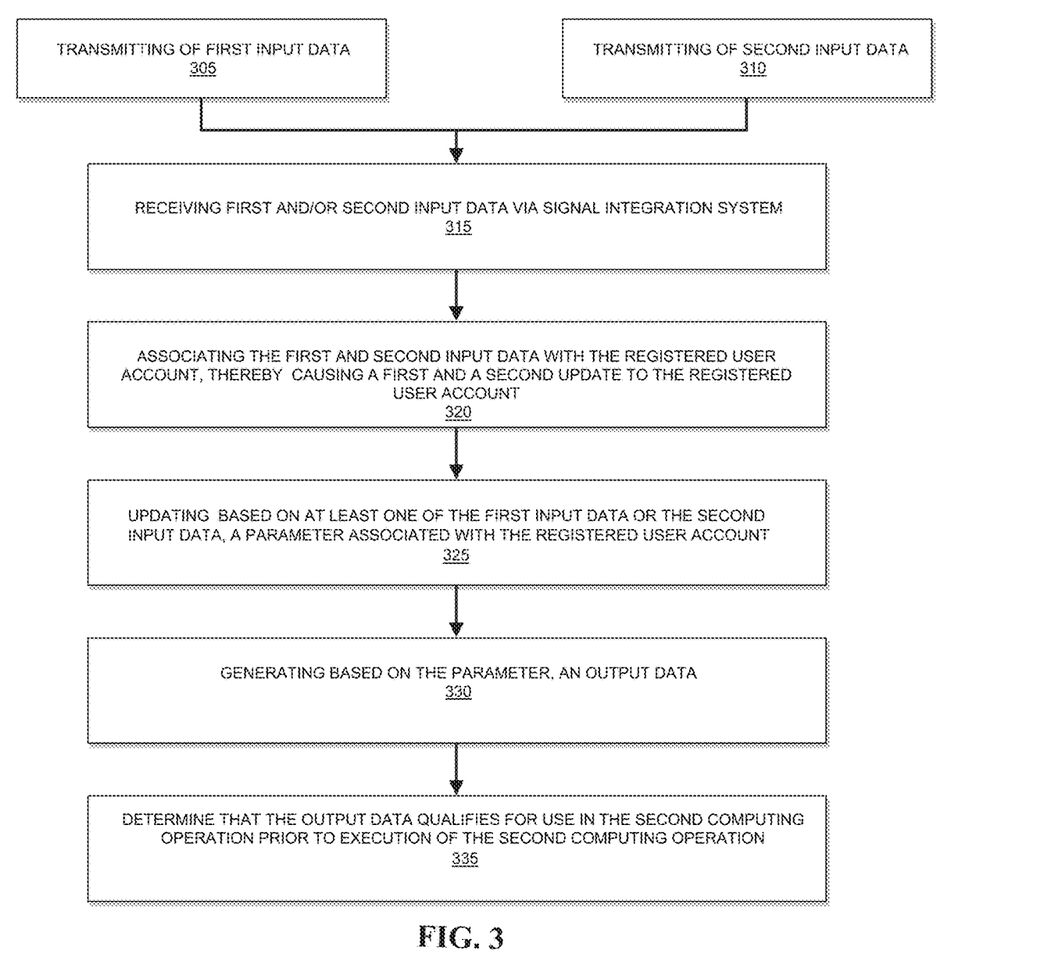
FIG. 3 is an example flowchart for obtaining and using data obtained from the transmitting system and the digital tracking and relaying system discussed in association with FIG. 1, according to some embodiments of this disclosure.

FIG. 3 is an example flowchart for obtaining and using data obtained from the transmitting system and the digital tracking and relaying system discussed in association with FIG. 1, according to some embodiments of this disclosure. The various processes executed in the flowchart of FIG. 3 may be executed by one or more computing device processors such as the computing device processors discussed in association with one or more components of the system shown in FIG. 1. Further, the various blocks of FIG. 3 may be executed in a different order from that shown in FIG. 3. At block 305, the method comprises transmitting a first input data. At block 310, the method comprises transmitting a second input data. In some embodiments, transmitting the first input data as depicted in block 305 and the second input data as depicted in block 310 may be associated with independent and/or autonomous transmissions. In other words, the second input data may be generated independently from the first input data and may be transmitted at a different time than the time of transmission of the first input data. The first input data may be used in a first computing operation associated with a first processing platform. The first and second input data, according to some implementations, may be associated with a registered user account stored in a user database. The second input data, according to some embodiments may be generated and/or transmitted using an application programming interface and may include usage data associated with one or more digital tracking and relaying systems. For example, the second input data may be captured using one or more sensors coupled to the one or more digital tracking and relaying systems. In some instances, the second input data comprises one or more of hardware data associated with usage of the one or more digital tracking and relaying systems, geo-location data associated with the one or more digital tracking and relaying systems, performance data associated with using the one or more digital tracking and relaying systems, etc. In some cases, the one or more digital tracking and relaying systems ping and/or track APIs (e.g., open APIs comprised in the one or more digital tracking and relaying systems and/or associated with an API processing and communication server) to generate the second input data as further discussed in association with FIG. 1. In one embodiment, credential data from a user may be received using a user interface of the one or more digital tracking and relaying systems such that the credential data is associated with the registered user account of the user. In response to a successful association of the registered user account with the credential data, one or more API's comprised in, or associated with the digital tracking and relaying system and/or associated with the API processing and communication server may be activated for generating and transmitting the second input data to a signal integration system. At block 315, the method comprises receiving the first and second input data via the signal integration system.

At block 320, the method comprises associating the first input data with a registered user account thereby causing a first update to the registered user account. The first update may comprise updating a first parameter associated with the registered user account. One or more computing device processors associated with the signal integration system 125 and/or one or more computing device processors associated with the identification database 135 may associate the second input data with the registered user account thereby causing a second update to the registered user account. The second update may comprise updating the first parameter associated with the registered user account or a second parameter associated with the registered user account. In some embodiments, the first parameter includes properties (e.g., a magnitude, a value, etc.) of one or more digital assets, rewards data, etc., associated with the first input data (e.g., data associated with payment activity) while the second parameter includes properties (e.g., qualitative and/or quantitative features) of one or more tokens, points, digital values, etc., associated with the second input data. In some cases, the qualitative features define aspects of the usage data associated with a user's skill (e.g., performance data), a user's regularity in using the digital tracking and relaying system, and other qualities associated with the user's interaction with the one or more digital tracking and relaying system. The quantitative features may define a magnitude for one or more tokens, points, rewards, digital assets, etc., based on the aforementioned qualitative features.

The one or more computing device processors associated with the signal integration system 125 and/or identification database 135 may enable usage of output data generated at 330, based on the first parameter or the second parameter, in a second computing operation associated with a second processing platform that is different from the first processing platform. A determination may be made that the output data qualifies for use, at 335, in the second computing operation prior to execution of the second computing operation.

In some cases, associating at least one of the first input data or the second input data with the registered user account comprises performing a third computing operation based on at least one of the first input data or the second input data. In some implementations, the system executing the processes outlined above may comprise one or more computing device processors that are comprised in one or more disparately located computing devices. The system (e.g., system environment of FIG. 1) may also execute an authentication operation based on identification or authentication information received from at least one of a user or a computing device prior to updating, adding, or editing data associated with or comprised in the registered user account.

In one embodiment, the usage data comprises usage duration or usage frequency data associated with the one or more digital tracking and relaying systems. Furthermore, the usage data may also comprise performance or achievement data associated with using the one or more digital tracking and relaying systems. According to some implementations, the second input data comprises game-related data. The second input data may also comprise physical activity-related data. In addition, the second input data may also comprise at least one of geo-location data or network location data associated with the one or more digital tracking and relaying systems.

The first input data may comprise at least one of geo-location data or network location data associated with the first computing operation. In some instances, the first input data comprises at least one of an amount or a type associated with the first computing operation. In some embodiments, the first input data may be received via the user interaction terminal and/or via the secure verification system discussed in association with FIG. 1. In some cases, the first input data may be received before reception of the second input data, or after reception of the second input data, or during reception of, or simultaneously with receiving the second input data as the case may be.

The at least one sensor comprised in the one or more digital tracking and relaying systems may include at least one of a software application that tracks data associated with the one or more digital tracking and relaying systems. The at least one sensor comprised in the one or more digital tracking and relaying systems may also include a hardware system that tracks data associated with the one or more digital tracking and relaying systems. The at least one sensor comprised in the one or more digital tracking and relaying systems may include a combination of a software application and a hardware system that track data associated with the one or more digital tracking and relaying systems. It is appreciated that the at least one sensor may capture relevant data that allows a digital tracking and relaying system to collaboratively generate or otherwise initiate generation of the second input data using an API processing and communication server as previously discussed.

Furthermore, the one or more digital tracking and relaying systems may comprise a specialized game-playing system. The one or more digital tracking and relaying systems may also comprise an exercise system. In some embodiments, the one or more digital tracking and relaying systems comprises a game-playing system. In some implementations, the one or more digital tracking and relaying systems comprises at least one of a desktop computer, a laptop computer, a handheld computing device, a gaming device or console, a smartphone, a wearable device, a biometric device, a video processing device, a virtual machine, a cloud-based computing or gaming or streaming system, a network-connected exercise equipment, a network appliance, a network-connected home device and/or an entertainment device.

According to some implementations, the parameter comprises the output data. The output data may qualify for use in the second computing operation based on at least one of a type of the second computing operation, a product or service associated with the second computing operation, an amount associated with the second computing operation, or a geo-location or a network location associated with the second computing operation.

In one embodiment, associating at least one of the first input data or the second input data with the registered user account, thereby causing the update to the registered user account, such that the update comprises updating a parameter associated with the registered user account, comprises: converting the first input data into a first intermediate input data associated with the registered user account; converting the second input data into second intermediate input data associated with the registered user account; and associating the at least one of the first intermediate input data or the second intermediate input data with the registered user account, or updating the parameter associated with the registered user account based on the at least one of the first intermediate input data or the second intermediate input data.

In some cases, the output data may be associated with one or more redeemable assets (e.g., digital points, combined digital assets associated with the first input data and/or the second input data, etc.). The output data, according to some implementations, may be used in a second computing operation associated with a second processing platform different from the first processing platform. For example, the second processing platform may be comprised in a redemption platform that facilitates redemption of one or more digital assets, tokens, reward points, etc., associated with the output data. In addition, a determination may be made that the output data qualifies for use in the second computing operation prior to executing the second computing operation. In some embodiments, the output data comprises a combined output data generated by one or more output data derived from the first intermediate input data and the second intermediate input data. In such instances, the combined output data is greater in magnitude than the first input data and/or the second input data. According to some implementations, the one or more transmitting systems transmitting the first input data may communicate with an identification database associated with the registered user account to register a user. In one embodiment, one or more digital tracking and relaying systems may communicate with the identification database to authenticate an identity of the user. In some instances, the one or more digital tracking and relaying systems may include a mobile computing device, and/or a network exercise equipment, and/or a gaming console, and/or a network appliance and entertainment device.

According to some embodiments, the flowchart of FIG. 3 includes executing a computing operation to determine an independent first and second intermediate input data. The method may also comprise transmitting the first and second intermediate input data via the signal integration system. The method may also comprise receiving and assigning the first and second intermediate input data to a registered user account or a registered entity account via the identification database. The method may also include determining a computing operation that establishes a data association between the first and second intermediate input data responsive to registering/associating the first and/or the second intermediate input data to the registered user account. The method may also comprise executing a computing operation to create output data or a combined data responsive to determining a data association between the first and second intermediate input data. In addition, the method may comprise transmitting the combined data to a second processing platform for use in a second computing operation prior to executing the second computing operation.

In some embodiments, execution of a computing operation via the signal integration system or the identification database may generate magnitudes for the first and second intermediate input data or a magnitude for a combined intermediate input data, respectively. It is appreciated that these data generations may be executed via a computing operation by either the signal integration system or the identification database based on a set of system of rules, or other criteria associated with one or more control files on one or more subsystems of FIG. 1. In some embodiments, execution of the computing operation may affect (e.g. increase or decrease) an attribute (e.g. a numerical amount) of the signals/data described herein. It is appreciated that, in some embodiments, a plurality of first and second input data may be stored in the signal integration system. A plurality of the first and second intermediate input data may be stored in the identification database. In addition, a plurality of output data may be stored in the signal manipulation system.

In some embodiments, a limit may be applied to the first and/or second intermediate input data and, in one or more cases, the first and/or second intermediate input data may be categorized and generated at different grades. The respective grades of the first and/or second intermediate input data may be determined through a different system or systems, which may comprise devices, networks, services, and/or application programming interfaces (APIs) for communicating with any of the other systems described herein.

In some embodiments, the transmitting system and/or the digital tracking and relaying system may further comprise one or more computing devices or services such as a desktop computer, smartphone, wearable device, gaming device/console, a cloud-based computing solution and/or service, etc. In such embodiments, the data (e.g., first and/or second input data) transmitted from the transmitting system or the digital tracking and relaying system may comprise a signal (e.g. identification data) that is unique to the computing device or service or to an account associated with the computing device or service. For example, such data may include a mobile device phone number or any other device or service identification numbers. In some embodiments, the computing device may comprise or have access to (e.g. from a cloud server) digital versions of multiple transmitting systems or digital tracking and relaying systems. In some embodiments, the computing device or service may include functionality of both the transmitting system and the digital tracking and relaying system. Therefore, the computing device or service may perform any process or comprise any feature that is described with respect to the transmitting system and/or the digital tracking and relaying system. In some embodiments, any of the systems illustrated in FIG. 1 (e.g. the signal integration system) may determine that the transmitting system or the digital tracking and relaying system is a computing device or service. In response to determining that the transmitting system or the digital tracking and relaying system is a computing device or service, the system may prompt the computing device or service for transmission of any data described herein.

In some embodiments, any transmissions between a computing device/system associated with FIG. 1 and any of the systems shown therein may be via any short range (e.g. near field communication, Bluetooth, Bluetooth Low Energy, etc.) or long-range wireless transmission mechanisms (e.g. cellular, Wi-Fi, etc.). In some embodiments, the frequency of transmission may not be limited to any particular frequency of the electromagnetic spectrum.

The present disclosure may have uses in many fields, such as computing science and software, electronic data management, digital signal processing, gaming, home utilities and smart services, sports and fitness, health and wellness, recreational activities, leisure activities, and live entertainment and events. Any exemplary uses described herein are for illustration purposes only. In some embodiments, the transmitting system may comprise a computing device such as a transaction device, smartphone or smartwatch. Alternatively, the transmitting system may comprise a card such as a transaction card, a loyalty card, etc. The card may be associated with an amount. The digital tracking and relaying system may comprise a computing device or service such as a desktop computer, gaming device/console, smartphone or cloud-based computing solution. In some embodiments, the first input data may comprise transaction activity such as payment card information, while the second input data may comprise behavioral activity information such as time spent gaming, in-game achievements, etc. In some embodiments, the first and second intermediate input data may represent rewards points uniquely associated with the transaction activity or the behavioral activity, respectively. Executing a computing operation based on the first and second intermediate input data may result in an original combined data. A combined data as described herein may be a new, amplified rewards point value that may result in a discount for a purchased resource or service and/or may be redeemed as an alternate form of currency.

The present disclosure provides several important technical advantages that will be readily apparent to one skilled in the art from the figures, descriptions, and claims. Moreover, while specific advantages have been enumerated above, various embodiments may include an, some, or none of the enumerated advantages.

While various embodiments in accordance with the disclosed principles have been described above, it should be understood that they have been presented by way of example only and are not limiting. Thus, the breadth and scope of the technology disclosed should not be limited by any of the above-described exemplary embodiments but should be defined only in accordance with the claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the subject-matter set out in any claims that may issue from this disclosure. Specifically, a description of a technology in the "Background" is not to be construed as an admission that technology is prior art to any subject-matter set forth in issued claims. Furthermore, any reference in this disclosure to "technology" in the singular should not be used to argue that there is only a single point of novelty in this disclosure. Multiple technologies may be set forth according to the limitations of the multiple claims issuing from this disclosure, and such claims accordingly define the technologies and their equivalents that are protected thereby. In all instances, the scope of such claims shall be considered on their own merits in light of this disclosure but should not be constrained by the headings herein.

The invention claimed is:

1. A method for using data from one or more digital tracking and relaying systems, the method comprising:
receiving, from one or more transmitting systems, using one or more computing device processors, a first input data associated with a registered user account, wherein:
the first input data is used in a first computing operation associated with a first processing platform, the first input data comprising at least one of:
location data associated with the first computing operation,
identification data associated with a computing device or service associated with the first computing operation,
an amount or type associated with the first computing operation;
the registered user account is stored in a user database;
receiving, from one or more digital tracking and relaying systems distinct from the one or more transmitting systems, using the one or more computing device processors, a second input data associated with the registered user account, wherein:

the second input data is generated independently from the first input data and received at a different time from a time of reception of the first input data, the second input data is transmitted or generated using an application programming interface (API) associated with the one or more digital tracking and relaying systems or associated with a communication server associated with the one or more digital tracking and relaying systems, the second input data comprises at least one of:
first activity data associated with the one or more digital tracking and relaying systems,
game-related data,
physical activity-related data,
geo-location data or network location data, or
second activity data transmitted from a network-connected device communicatively coupled to at least one of:
the one or more digital tracking and relaying systems, or
the communication server associated with the one or more digital tracking and relaying systems;

associating, using the one or more computing device processors, the first input data with the registered user account, thereby causing a first update to the registered user account, wherein the first update comprises updating a first parameter associated with the registered user account;

associating, using the one or more computing device processors, the second input data with the registered user account, thereby causing a second update to the registered user account, wherein the second update comprises updating a second parameter associated with the registered user account, wherein the first parameter is associated with at least one of an asset, a reward, a token, a point, spending data, or payment data, and wherein the second parameter is associated with at least one of a second asset, a second reward, a second token, a second point, third activity data, usage data, or performance data;

generating, using the one or more computing device processors, output data using a first value of the first parameter and a second value of the second parameter, the output data comprising one or more redeemables, wherein an amount of the one or more redeemables is based on the first value of the first parameter or the second value of the second parameter, and wherein the one or more redeemables are added to the registered user account associated with at least one of the first input data used in the first computing operation and the second input data generated independently from the first input data; and enabling usage of the one or more redeemables in a second computing operation associated with a second processing platform different from the first processing platform, wherein:
a determination is made that the one or more redeemables qualifies for use in the second computing operation prior to execution of the second computing operation, and
the second computing operation comprises an operation that redeems the one or more redeemables.

2. The method of claim 1, wherein the first activity data comprises one or more of:
usage data generated from the network-connected device;
usage data generated with a first input device communicatively coupled to the network-connected device;
usage data generated by a second input device associated with the communication server;
usage data generated by an output device communicatively coupled to at least one of:
the one or more digital tracking and relaying systems,
the communication server, or
at least one accessory device,
usage duration or usage frequency data associated with the one or more digital tracking and relaying systems; and
performance or achievement data associated with using the one or more digital tracking and relaying systems.

3. The method of claim 1, wherein the location data comprises geo-location data or network location data associated with the first computing operation of the one or more digital tracking and relaying systems.

4. The method of claim 1, wherein at least one sensor comprised in the one or more digital tracking and relaying systems captures the second input data, the at least one sensor includes one or more of:
a software application that tracks data associated with the one or more digital tracking and relaying systems, or
a hardware system that tracks data associated with the one or more digital tracking and relaying systems, wherein:
the at least one sensor comprised in the one or more digital tracking and relaying systems captures activity data associated with the one or more digital tracking and relaying systems, and the second input data is generated based on the activity data.

5. The method of claim 1, wherein the one or more digital tracking and relaying systems is associated with, or comprised in a cloud-based system, the one or more digital tracking and relaying systems comprising at least one of a specialized game-playing system, an exercise system, and a game-playing system.

6. The method of claim 1, wherein the one more digital tracking and relaying systems comprises at least one of a desktop computer, a laptop computer, a handheld computing device, a gaming device or console, a smartphone, a wearable device, a biometric device, a video processing device, a virtual machine, a cloud-based computing or gaming or streaming system, a network-connected exercise equipment, a network appliance, a network-connected home device, or an entertainment device.

7. The method of claim 1, wherein:
the first parameter comprises at least one of:
the output data, or wherein the output data comprises the first parameter,
the first value of the first parameter or a first magnitude of the first parameter, and
the second parameter includes at least the second value or a quantity of the second parameter that is associated with usage data of the digital tracking and relaying systems.

8. The method of claim 1, wherein the output data includes at least a combination of the first value of the first parameter and the second value of the second parameter, such that the output data qualifies for use in the second computing operation based on at least one of:
a type of the second computing operation,
a product or service associated with the second computing operation,
an amount associated with the second computing operation,
or a geo-location or a network location associated with the second computing operation.

9. The method of claim 1, wherein associating at least one of the first input data or the second input data with the registered user account, thereby causing the first update or the second update to the registered user account, wherein the first update or the second update comprises updating the first parameter associated with the registered user account, comprises:
 converting the first input data into a first intermediate input data associated with the registered user account;
 converting the second input data into a second intermediate input data associated with the registered user account; and
 associating at least one of the first intermediate input data or the second intermediate input data with the registered user account, or updating the first parameter associated with the registered user account based on the at least one of the first intermediate input data or the second intermediate input data.

10. The method of claim 1, wherein the second input data comprises fourth activity data generated by at least one of:
 an input device communicatively coupled to the one or more digital tracking and relaying systems or associated with the communication server associated with the one or more digital tracking and relaying system; or
 an accessory communicatively coupled to the one or more digital tracking and relaying systems or associated with the communication server associated with the one or more digital tracking and relaying systems.

11. The method of claim 1, wherein receiving the second input data further comprises:
 receiving credential data from a user using an interface of the one or more digital tracking and relaying systems, the credential data being associated with the registered user account;
 activating, based on validating the credential data, the API associated with the one or more digital tracking and relaying systems or associated with the communication server associated with the one or more digital tracking and relaying systems; and
 receiving the second input data using the API comprised in, or associated with the one or more digital tracking and relaying systems.

12. The method of claim 1, wherein the API comprises an open API, and wherein the method further comprises:
 tracking the open API, using the one or more digital tracking and relaying systems; and
 transmitting or generating the second input data based on the tracking.

13. The method of claim 1, wherein receiving the first input data includes at least one of:
 receiving the first input data prior to receiving the second input data;
 receiving the first input data after receiving the second input data; and
 receiving the first input data simultaneously with receiving the second input data.

14. An apparatus for using data from one or more digital tracking and relaying systems, the apparatus comprising:
 one or more computing system processors; and
 memory storing instructions that, when executed by the one or more computing system processors, causes the apparatus to:
 receive, from one or more transmitting systems, a first input data associated with a registered user account, wherein:
  the first input data is used in a first computing operation associated with a first processing platform, the first input data comprising at least one of:
   location data associated with the first computing operation,
   identification data associated with a first computing device or service associated with the first computing operation,
   an amount or type associated with the first computing operation;
  the registered user account is stored in a user database;
 receive, from one or more digital tracking and relaying systems distinct from the one or more transmitting systems, second input data associated with the registered user account, wherein:
  the second input data is generated independently from the first input data and received at a different time from a time of reception of the first input data,
  the second input data is generated or transmitted using an application programming interface (API) comprised in the one or more digital tracking and relaying systems or comprised in one or more communication servers associated with the one or more digital tracking and relaying systems, the second input data comprises at least one of:
   first activity data associated with the one or more digital tracking and relaying systems,
   game-related data,
   physical activity-related data,
   geo-location data or network location data, or
   second activity data transmitted from a network-connected device communicatively coupled to at least one of:
    the one or more digital tracking and relaying systems, or
    the one or more communication servers associated with the one or more digital tracking and relaying systems;
 associate at least one of the first input data or the second input data with the registered user account, thereby causing an update to the registered user account, wherein the update comprises updating a parameter associated with the registered user account, wherein the parameter is associated with at least one of an asset, a reward, a token, a point, spending data, third activity data, usage data, performance data, or payment data;
 generate output data using a value of the parameter, the output data comprising one or more redeemables, wherein an amount of the one or more redeemables is based on the value of the parameter, and wherein the one or more redeemables are added to the registered user account associated with at least one of the first input data used in the first computing operation and the second input data generated independently from the first input data; and
 enable usage of the one or more redeemables in a second computing operation associated with a second processing platform different from the first processing platform, or associated with the first processing platform, wherein:
  a determination is made that the one or more redeemables qualifies for use in the second computing operation prior to, during, or after execution of the second computing operation, and
  the second computing operation comprises an operation that redeems the one or more redeemables.

15. The apparatus of claim 14, wherein the an authentication operation is executed using the apparatus prior to associating at least one of the first input data or the second input data with the registered user account.

16. The apparatus of claim 14, wherein the one or more computing system processors are comprised in one or more disparately located computing devices, the one or more computing system processors being configured to further:
generate a first intermediate input data based on the first input data,
generate a second intermediate input data based on the second input data, and
combine the first intermediate input data with the second intermediate input data to generate a first combined data, wherein the first combined data is comprised in the output data.

17. The apparatus of claim 16, wherein:
the one or more disparately located computing devices are used for at least one of receiving, processing, generating, manipulating, or outputting at least one of the first input data, the second input data, or the output data, and
the first combined data is categorized to have a first grade that is different from a second grade of a second combined data associated with the digital tracking and relaying systems.

18. The apparatus of claim 17, wherein the first combined data indicates an increase in magnitude over a first magnitude associated with the first input data and a second magnitude associated with the second input data.

19. A method for using data from one or more digital tracking and relaying systems, the method comprising:
receiving, from one or more transmitting systems, using one or more computing device processors, a first input data associated with a registered user account, wherein:
the first input data is used in a first computing operation associated with a first processing platform, the first input data comprising at least one of:
location data associated with the first computing operation,
identification data associated with a computing device or service associated with the first computing operation,
an amount or type associated with the first computing operation;
the registered user account is stored in a user database;
receiving, from one or more digital tracking and relaying systems distinct from the one or more transmitting systems, using the one or more computing device processors, a second input data associated with the registered user account and captured by at least one sensor comprised in the one or more digital tracking and relaying systems, wherein:
the second input data is generated independently from the first input data and received at a different time from a time of reception of the first input data,
the second input data is transmitted or generated using an application programming interface (API) associated with the one or more digital tracking and relaying systems or associated with a communication server associated with the one or more digital tracking and relaying systems, the second input data comprises at least one of:
first activity data associated with the one or more digital tracking and relaying systems,
game-related data,
physical activity-related data,
geo-location data or network location data, or
second activity data transmitted from a network-connected device communicatively coupled to at least one of:
the one or more digital tracking and relaying systems, or
the communication server associated with the one or more digital tracking and relaying systems;
associating, using the one or more computing device processors, the first input data with the registered user account, thereby causing a first update to the registered user account, wherein the first update comprises updating a first parameter associated with the registered user account;
associating, using the one or more computing device processors, the second input data with the registered user account, thereby causing a second update to the registered user account, wherein the second update comprises updating a second parameter associated with the registered user account, wherein the first parameter is associated with at least one of an asset, a reward, a token, a point, spending data, or payment data, and wherein the second parameter is associated with at least one of a second asset, a second reward, a second token, a second point, third activity data, usage data, or performance data;
generating output data using a first value of the first parameter or a second value of the second parameter, the output data comprising one or more redeemables, wherein an amount of the one or more redeemables is based on the first value of the first parameter or the second value of the second parameter, and wherein the one or more redeemables are added to the registered user account associated with at least one of the first input data used in the first computing operation and the second input data generated independently from the first input data; and
enabling usage of the one or more redeemables in a second computing operation associated with a second processing platform different from the first processing platform, wherein:
a determination is made that the one or more redeemables qualifies for use in the second computing operation prior to execution of the second computing operation, and
the second computing operation comprises an operation that redeems the one or more redeemables.

20. The method of claim 19, wherein the one or more digital tracking and relaying systems is associated with, or comprised in a cloud-based system, the one or more digital tracking and relaying systems comprising at least one of a specialized game-playing system, an exercise system, and a game-playing system.

* * * * *